(12) United States Patent
Partovi et al.

(10) Patent No.: US 8,572,169 B2
(45) Date of Patent: Oct. 29, 2013

(54) SYSTEM, APPARATUS AND METHOD FOR DISCOVERY OF MUSIC WITHIN A SOCIAL NETWORK

(75) Inventors: Hadi Partovi, Seattle, WA (US); Ali Partovi, Piedmont, CA (US); Nathaniel Scott Brown, Seattle, WA (US); Yevgeny Zarakhovsky, Seattle, WA (US); Benjamin Botts Osheroff, Fairfax, CA (US); Firooz Partovi, Hillsborough, CA (US)

(73) Assignee: Myspace, LLC, Beverly Hills, CA (US)

( * ) Notice: Subject to any disclaimer, the term of this patent is extended or adjusted under 35 U.S.C. 154(b) by 1326 days.

(21) Appl. No.: 11/511,684

(22) Filed: Aug. 28, 2006

(65) Prior Publication Data

US 2008/0052371 A1    Feb. 28, 2008

(51) Int. Cl.
  *G06F 15/16*  (2006.01)
(52) U.S. Cl.
  USPC .......................................... 709/204; 709/226
(58) Field of Classification Search
  USPC ............................ 709/204, 226; 707/4, 104.1
  See application file for complete search history.

(56) References Cited

U.S. PATENT DOCUMENTS

| | | | |
|---|---|---|---|
| 6,681,108 B1 | 1/2004 | Terry et al. | |
| 6,728,354 B1* | 4/2004 | Fleck et al. | 379/142.06 |
| 7,069,308 B2 | 6/2006 | Abrams | |
| 7,266,684 B2 | 9/2007 | Jancula | |
| 2002/0160338 A1 | 10/2002 | Yirmeyahu | |
| 2003/0078889 A1 | 4/2003 | Lee et al. | |
| 2004/0044727 A1 | 3/2004 | Abdelaziz et al. | |
| 2004/0215793 A1 | 10/2004 | Ryan et al. | |
| 2005/0038819 A1* | 2/2005 | Hicken et al. | 707/104.1 |
| 2005/0038876 A1* | 2/2005 | Chaudhuri | 709/219 |
| 2005/0055372 A1 | 3/2005 | Springer, Jr. et al. | |
| 2005/0154764 A1* | 7/2005 | Riegler et al. | 707/104.1 |
| 2006/0004914 A1 | 1/2006 | Kelly et al. | |
| 2006/0020662 A1* | 1/2006 | Robinson | 709/203 |
| 2006/0143236 A1* | 6/2006 | Wu | 707/104.1 |
| 2006/0247940 A1 | 11/2006 | Zhu et al. | |
| 2006/0271460 A1 | 11/2006 | Hanif | |
| 2006/0282303 A1 | 12/2006 | Hale et al. | |
| 2007/0011161 A1 | 1/2007 | Norton et al. | |
| 2007/0016469 A1 | 1/2007 | Bae et al. | |
| 2007/0250715 A1 | 10/2007 | Cai et al. | |
| 2007/0266446 A1 | 11/2007 | Aaron | |
| 2008/0004959 A1 | 1/2008 | Tunguz-Zawislak et al. | |

(Continued)

OTHER PUBLICATIONS

Jaccard Index, from Wikipedia, free encyclopedia, pp. 1-3. Retrieved from the Internet: <URL:http://en.wikipedia.org/wiki/Jaccard_index>.

*Primary Examiner* — Liangche A Wang
(74) *Attorney, Agent, or Firm* — Gates & Cooper LLP

(57) ABSTRACT

A system, apparatus, and method to assist in the discovery of music or other content by members of a social network. The present invention permits network members to network together and share information about their music collections and listening habits with a processing platform and with each other. The processing platform processes music library content and playback related data to produce similarity and compatibility measures between artists (that is, an artist-to-artist measure) and between network members (that is, a network member-to-network member measure). By combining the content and playback related data with filtering mechanisms, recommendation techniques (which may be based on the calculated measures), and set membership concepts, the present invention provides network members of the network with tools to discover artists and/or songs that are likely to be of interest to them.

38 Claims, 8 Drawing Sheets

(56) References Cited

U.S. PATENT DOCUMENTS

| | | |
|---|---|---|
| 2008/0214148 A1 | 9/2008 | Ramer et al. |
| 2008/0215348 A1 | 9/2008 | Guldimann et al. |
| 2008/0243593 A1 | 10/2008 | Ko et al. |
| 2009/0070184 A1* | 3/2009 | Svendsen ............... 705/10 |
| 2009/0083117 A1* | 3/2009 | Svendsen et al. ............... 705/10 |
| 2009/0112701 A1 | 4/2009 | Turpin et al. |

* cited by examiner

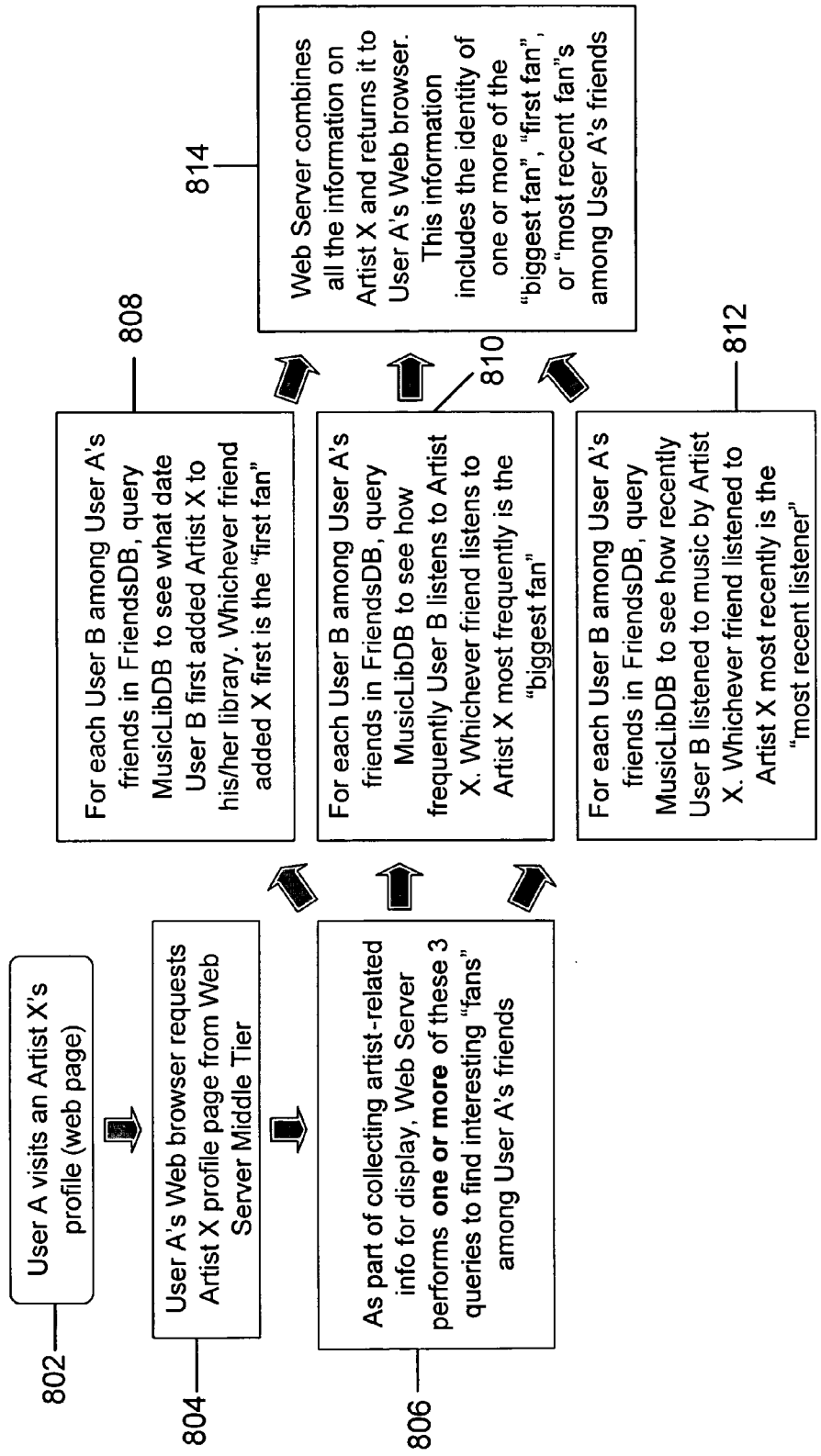

SYSTEM, APPARATUS AND METHOD FOR DISCOVERY OF MUSIC WITHIN A SOCIAL NETWORK

BACKGROUND OF THE INVENTION

The present invention is directed to systems, apparatus and methods for the discovery of content within a social network, and more specifically, to a system to enable members of a social network to discover music of interest contained in the music libraries of network members. The system utilizes an automated process to calculate similarity and/or compatibility measures based on members' music listening habits and music libraries, and combines the measures with filtering and other techniques to produce a set of music discovery tools for network members.

The advent and popularity of portable music players, for example, MP3 players, has provided users with the ability to access a large number of songs in a convenient manner. The portability and relatively large storage capacity of such devices has made it possible for users to have their entire music collection on a single, transportable device. At the same time it has created great interest in developing ways for users to learn of (i.e., discover) music that might be of interest to them so that they can add the music to their collection. Traditionally, the primary ways for a user to discover music have been via (1) the radio, and (2) word of mouth (i.e., via friends). However, in addition to such methods, there has been recent interest in developing other ways for users to learn of music that might be of interest to them.

In an effort to assist users to discover music that might be of interest to them, several approaches have been pursued. These approaches generally rely on a user publishing a list of their music interests or current music being enjoyed (e.g., a playlist) and then enabling friends or other invitees to access the list. One example of such a playlist publishing model involves allowing a user to publish a playlist to a web site, and then enabling the list to be accessed by specific friends or acquaintances. Those accessing the list may review the playlist and in some cases, be provided with a link to enable download of selected songs from the list. Apple Computer™, the creator of iTunes™, provides a feature named iMix which permits a user to publish a playlist from an iTunes™ media library. The list can be sent to a friend, who may then browse the playlist and purchase & download individual songs from the list or purchase the entire playlist. Other similar offerings include those of WebJay™ (recently acquired by Yahoo™) which provides a website for sharing playlists, and Musicmobs (www.musicmobs.com; which assists a user to upload a playlist from iTunes™ to the Musicmobs website). However, all of these approaches require that a user actively publish a playlist to a web site or web-service, and then optionally invite one or more friends via a message to access the published playlist. When the friend accesses the published playlist, the friend must then decide whether or not they like the music, and if so, decide whether to purchase one or more of the songs.

Another approach to assisting users to discover music that might be of interest is allowing a user to publish their personal musical tastes to a location accessible by others. The leading companies in this space are believed to include Last.FM™ and Musicmobs. Both companies are believed to provide a user with client-side software that automatically examines the user's media library, tracks what music is being played, and uploads that data to a website. It is understood that the uploaded data is processed to report certain of the user's music listening habits (e.g., most-listened-to-artists or most-listened-to-songs) for others to access. Such services may also allow a user to publish their music listening habits (as determined by these web services) as an embedded resource on another website (such as a web page on a social network, e.g., MySpace™).

Although the above described approaches to music discovery do permit a user to share their music interests and listening habits with others, they do not provide a complete solution to the problem. The above approaches generally lack sufficient automation or other data processing assistance that can add value by assisting those viewing the data to determine which music would be of greatest interest. This is because the present approaches operate so that once a playlist or summary of listening habits is published, those accessing the information have to decide for themselves (with no further information) whether the listed songs are of interest. Since users may have a music collection numbering in the thousands of songs, without more information, it is very difficult for someone to select which, if any, of a friend's music is of sufficient interest to warrant listening to or downloading. In this sense, present methods lack a way to assess the likelihood that music of interest to one user will be of interest to another. Further, present methods lack a way to quantify this likelihood, should that be of interest to a user.

What is desired is a system, apparatus and method for enabling the efficient discovery of and access to music content, where such system, apparatus, and method overcomes the noted disadvantages of present approaches.

BRIEF SUMMARY OF THE INVENTION

The present invention is directed to a system, apparatus, and method to assist in the discovery of music or other content by members of a social network. The present invention permits users to network together and share information about their music collections and listening habits with a processing platform and with each other. The information includes data related to the content of the network members' music libraries (such as the names of songs and artists contained in a network member's library) as well as data related to the use of that content (such as a playcount for each song, and the date, time, and frequency with which a song or artist is played by a network member). The processing platform provides the ability to process the music library content and playback related data to produce similarity and/or compatibility measures between artists (that is, an artist-to-artist measure) and between network members (that is, a member-to-member measure). By combining the content and playback related data with filtering mechanisms, recommendation techniques (which may be based on the calculated measures), and set membership concepts, the present invention provides members of the network with tools to assist in the discovery of music. In one embodiment, based on the results of the data processing, the present invention is capable of generating recommendations of artists and/or songs to members of the network. In this way, the present invention assists members of the social music network to discover music content that is more likely to be of interest to them.

In addition to generating recommendations, the present invention is capable of generating other outputs that facilitate the discovery of music (and other content), where that music is expected to be of interest to a member of the network. Along with the recommendations, these outputs may broadly be termed "music discovery tools". Specifically, one feature of the invention is that a network member can access (or in terms of the user interface, "see" information regarding) the music library and music listening data of another network member, a friend who is a network member (or has been invited to join the network), or a group of members of the network. Various inventive filtering mechanisms may be applied to this data to produce results that are contextually relevant to the network member viewing the data. Examples of such filtering mechanisms include showing music not currently owned by the network member but contained in the music library of a relevant person or group, or showing the songs played most by a person or group (i.e., the most popular songs) but not currently owned by the network member. Such filtering mechanisms may be applied independently of each other or sequentially (e.g., what songs are played most by the group, followed by determining which of those a network member does not presently own). This allows a network member to filter and/or order the data to provide contextually relevant results that permit the network member to discover music content that is expected to be of interest to them.

In one embodiment, the present invention is directed to a social music network that includes a plurality of client agents, where each client agent is associated with a respective network member and configured to communicate and exchange data with a processing platform. Each client agent is further configured to provide one or more types of data regarding the respective network member's music library to the processing platform where the data is processed to produce an output representing a music discovery tool that may be used by a member of the network to discover music of interest to that member.

In another embodiment, the present invention is directed to a social music network server that includes a communications interface configured to receive data from a plurality of social music clients, where each social music client is associated with a respective network member and configured to provide data regarding the respective network member's music library to the server. The server further includes a processor to process the received data and generate an output representing a music discovery tool that may be used by a member of the network to discover music of interest to that member.

In yet another embodiment, the present invention is directed to a method of generating a music discovery tool for a member of a social network that includes determining data regarding the music library contents or music library contents usage of a plurality of members of the social network and processing the data to generate an output representing a music discovery tool that may be used by a member of the network to discover music of interest to that member.

Other objects and advantages of the present invention will be apparent to one of ordinary skill in the art upon review of the detailed description of the present invention and the included figures.

BRIEF DESCRIPTION OF THE DRAWINGS

FIG. 8 is a flowchart showing an example of the primary steps in the generation and display of a second recommendation feature (or music discovery tool) between two members of the social music discovery network of the present invention.

DETAILED DESCRIPTION OF THE INVENTION

Figure 1:
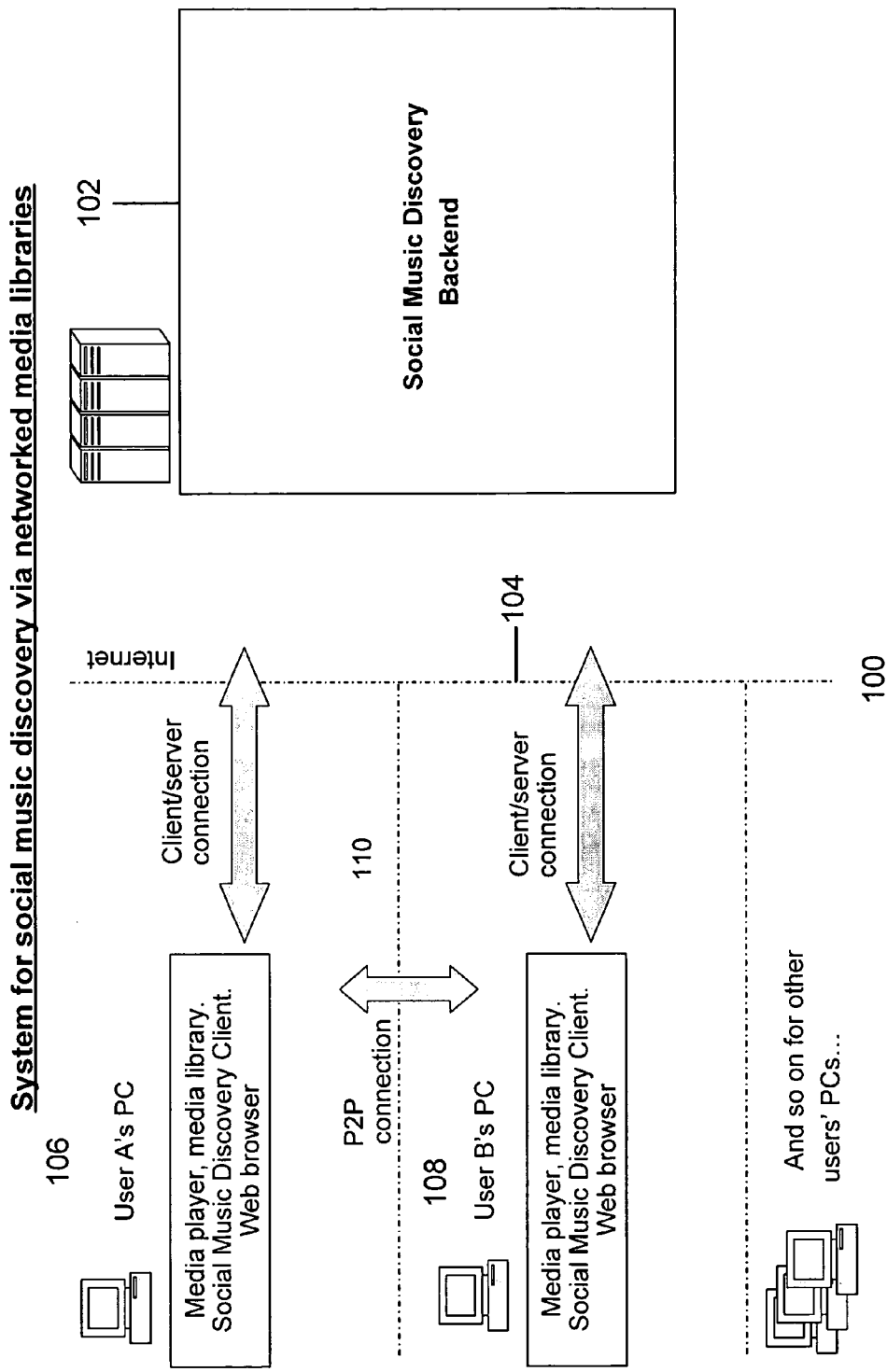
FIG. 1 is a functional block diagram of the primary components of a system for enabling efficient discovery of music content within a social music network, in accordance with the present invention.

The present invention is directed to a system, apparatus, and method for the efficient discovery of music between members of a social music network. The inventive system permits members of a social music network to discover music contained in other members' music collections that may be of interest, with that interest suggested by processing of content and playback related data, calculated compatibility and similarity measures, and data filtering techniques. The system further includes the ability to generate artist and song recommendations to members of the network based on a variety of indicia of potential interest. In addition to generating recommendations, the present invention is capable of producing other types of music discovery tools that facilitate the discovery of music (and other content) expected to be of interest to a member of the network. Such tools may be obtained by application of various filtering mechanisms to the music library and music listening data of another network member, a friend who is a member of the network (or has been invited to become one), or a group of network members. An example of such a filtering mechanism is to show a network member music owned by or actively listened to by another network member, friend or group but that is not currently owned by the network member. Another example of such a filtering mechanism is to show the songs owned by or played most by a person or group. Further, note that such filtering mechanisms may be applied independently of each other or sequentially (e.g., what songs are played most by the group, followed by determining which of those the network member does not presently own).

The inventive system provides an infrastructure and relevant processes to enable multiple users to form a social network, with that network designed to permit the tracking and exchange of data concerning members' musical interests and tastes. The data is obtained using social music discovery client software installed on members' computing and/or music playback devices. The client software tracks a network member's music interests and tastes as evidenced by the artists and songs contained in a network member's music library, and by the music playback activities of the network member. The data monitored or collected by the client software is processed by a processing platform of the system to produce, among other results, a measure of the similarity or compatibility of the musical tastes of a first network member and a second network member, or between a first artist and a second artist. The system further utilizes information about the content of a network member's musical library and playback activities, combined (if desired) with the similarity/ compatibility measures, set membership concepts and/or collaborative filtering techniques to provide network members with insights into music that they do not currently have access to, but that may be of interest to them. It is further expected that the network member's level of interest will be more than nominal by virtue of the results of the data processing and other analysis applied to the library, playback, and similarity/compatibility measure data.

Note that although in portions of the description of the present invention, reference is made to a first network member, it is to be understood that unless it would lead to an inconsistency or present a problem regarding clarity, the term is intended to refer to either a single network member or to a group of network members. Similarly, when reference is made to a second network member, it is to be understood that unless it would lead to an inconsistency or problem regarding clarity, the term is intended to refer to either a single network member or to a group of network members. Thus, when reference is made in the description, figures, or claims to a first network member and a second network member, it is to be understood that the first member may be a single member or group of members and the second member may be a single member or group of members. Furthermore, the same understanding is to apply to references to a music library, music artist, or other aspects of the invention wherein reference to a singular item could be replaced without inconsistency with reference to a group of items.

The measure of similarity or compatibility may be the result of evaluating a specified metric (e.g., a quantity used to characterize a set of data) for a network member's musical library or listening habits and comparing that to the value of the same metric for a second network member. In such a method, the metric is evaluated for each network member's data set separately, and then the values of the metric are compared to obtain a measure of the similarity or compatibility between the network members (generally by application of a heuristic to the metric values). In addition to evaluation of a defined metric, the measures may also result from application of a statistical analysis technique to the data (e.g., a center of gravity analysis or a clustering technique to determine how closely each network member's musical tastes are to a defined standard), or a curve or surface fitting technique to determine an equation or surface that can be used to characterize a network member's music library or listening habits.

A similarity or compatibility measure may also be obtained by performing an analysis of the two network member's data as groups, the contents of which are compared relative to each other. A wide variety of suitable methods can be used, including similarity calculation methods typically used in the area of Collaborative Filtering. Such methods include the Cosine-Based Similarity method, for example. The inventors have also developed correlation and similarity measure techniques suitable for use as part of the present invention, and which will be described in greater detail.

In addition to the similarity or compatibility measures, the present invention also utilizes certain filtering mechanisms and set membership concepts to process the data and generate recommendations or other outputs that facilitate the discovery of music by a member of the network. These set membership concepts include intersection (the set of elements common to a first and second set), union (the set of elements generated by combining the elements of a first and second set), and set differences (the set of elements obtained by determining those members of a first set not present in a second, or vice-versa). For example, using such concepts it is possible to develop a measure of the degree of overlap of the two network member's music listening habits (similar to the intersection of two sets), a measure of the lack of overlap of the data sets, or a measure of the similarity of the artists contained in the two network member's musical libraries.

Using the music library contents and usage data, and if desired, the generated similarity and compatibility measures, appropriate filtering mechanisms and set membership concepts, the present invention generates music discovery tools for a member of the network. These tools provide insight into the music contained in one network member's library (or a group of members' libraries) that is expected to of greater than nominal interest to a second network member (or group of network members). After identifying such music (either in the form of a song or an artist), the inventive system is capable of generating a recommendation to the second network member (or group of members), where the recommendation may include a sample of the song or artist. The inventive system may also produce other outputs that assist a network member (or group of members) to discover music that is expected to be of interest to them. Such outputs include a display of music not currently in the network member's music library (or group's libraries) that satisfies one or more criteria. These criteria may include music popular with one or more network members that is expected to be of interest (e.g. by virtue of a similarity/compatibility measure calculation) or music that a network member doesn't have but that is found in the libraries of members of a group, or of a friend or group of friends.

As noted, the inventive system may also rely on evaluation of other suitably defined metrics or analysis techniques that can be used to characterize the data. For example, such metrics or analysis techniques include those utilized in Collaborative Filtering or Collaborative Recommendation methods, and a variety of forms of statistical analysis. For example, such methods include similarity measures that are used as the basis for generating recommendations. Such similarity measures are used to quantify the relative similarity (or closeness) of two data sets, typically by expressing a characteristic of such data sets as an n-dimensional vector or n-by-m dimensional matrix. Examples of such similarity measures include those termed the Cosine-based Similarity, Correlation-based Similarity, and Adjusted Cosine Similarity methods.

The result of evaluating the measure, metric or technique that is utilized will typically be a characterization of the music library and/or musical taste of the network member (or group) whose data is processed, or a characterization of a relationship between the music library and/or musical taste of a pair of network members (such as the correlation, etc.). When provided a measure or metric for a first network member and a second network member, an indicator of the similarity of the two network member's musical libraries or of the compatibility of the two network member's musical tastes can be inferred. This indicator may be the result of comparing the two measures or metrics, processing the two measures or metrics in accordance with a heuristic to determine the "closeness" of the two measures, requiring a certain minimum measure of similarity or compatibility, etc.

Further, a value of the characterizing parameter may be thresholded, scaled, or otherwise processed to determine its relevance and assess the similarity or compatibility of the network members' musical tastes. Regardless of how obtained, the result may be taken as an indicia of the likelihood that the musical tastes or interests of a first network member will be of interest to a second network member. If these indicia are of sufficient value, then the inventive system may be used to generate recommendations (either automatically or via user action) to the second network member of an artist or song contained in the music library of the first network member. As noted, the system may also generate other outputs to a network member that are intended to facilitate the discovery of music that is expected to be of interest to them (e.g., by showing the network member music that they do not currently have that is popular with one or more members of the network, such as a group of friends or those with similar music interests).

As noted, in addition to generating recommendations regarding music contained in one network member's library that may be of interest to a second network member, the inventive system may be used to indicate other data or relationships of interest. For example, the system may be used to indicate to a network member what music contained in another network member's music library is not in their own library, what music that is popular with one network member is not known to a second network member, or which network member is the first, newest or biggest fan of a particular song or artist. The system may also be used to indicate for a given artist those songs popular with a first network member (or group of members, such as a group of friends with similar music interests) that are not presently in the music library of a second network member. Further, the system may also be used to indicate for a network member those artists/songs similar to those popular with the network member but that are not presently contained in the network member's music library.

The system may also be used to generate recommendations using a collaborative filtering technique. In such a collaborative filtering technique, an artist popular with a first network member may be recommended to a second network member because of the similarity of that artist to one popular with the second network member. Further, such filtering techniques may be used to recommend an artist to a network member because other network members indicate an interest in that artist, and the other network members have sufficient overlap with the musical tastes or interests of the network member.

Further examples of the inventive system and additional details regarding the implementations of the inventive system previously discussed will now be presented with reference to the figures.

FIG. 1 is a functional block diagram of the primary components of a system 100 for enabling efficient discovery of music content within a social music network, in accordance with the present invention. As shown in the figure, system 100 includes a social music discovery backend element 102, which may include one or more servers or other data processing modules. Such data processing modules may include computing devices, processors, micro-processors, state machines or the like. Social music discovery backend 102 is coupled to one or more network members via a client/server connection over a communication channel, such as the Internet, or another suitable network 104. Note that network 104 acts to couple backend 102 to each of a plurality of network members (depicted as User A 106, User B 108, and other users' PCs in the figure).

As noted, system 100 includes one or more network members, shown as User A 106, User B 108, and other users in the figure. Each such network member operates a personal computer or other computing device that includes a storage medium containing a media library, a social music discovery client of the present invention, and a web browser or other suitable means for exchanging data between the network member's computing device and the social music discovery backend 102. Note that the personal computer or other computing device may be a mobile phone, properly configured dedicated music playback device (e.g., an MP3 player or home stereo component), or other device having the functionality and data communications capabilities described. The social music discovery client software contained in a network member's computing device may be a separate software program or may be integrated with other functions, e.g., being part of a browser or other application program. The social music discovery client software in one member's device may communicate with the social music discovery client software in another network member's computing device using a peer-to-peer (P2P) communication protocol/method 110, with communications typically transferred over the Internet or another suitable network. Note that in the case of mobile devices, the network 104 may include wireless communications capabilities.

The social music discovery client software of the present invention is responsible for accessing a network member's media library (e.g., stored music content) and certain data related to the media library, such as content description, media playback characteristics, and related indicia of usage. The client is also one of the elements responsible for transferring this information to the social music discovery backend 102, where the data is processed to produce the compatibility measures, similarity measures and music discovery tools (e.g., recommendations) that are some of the features of the present invention.

Figure 2:
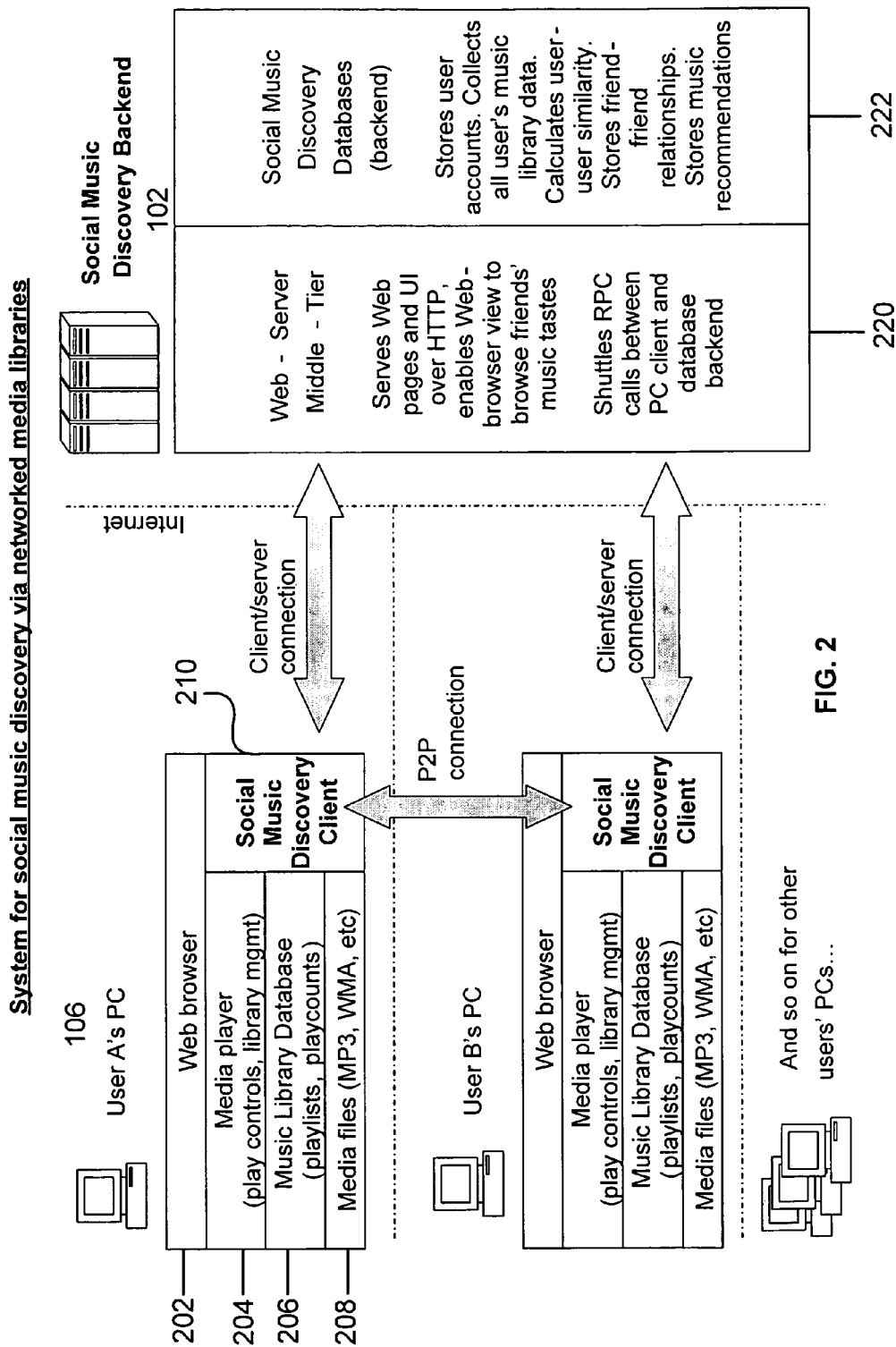
FIG. 2 is a more detailed version of the block diagram of FIG. 1, showing the primary functional elements of the functional blocks of that figure.

FIG. 2 is a more detailed version of the block diagram of FIG. 1, showing the primary functional elements of the functional blocks of that figure. As shown in FIG. 2, each network member's computing device will typically include a web browser 202 for communicating between the device and social music discovery backend server 102 over the Internet, and requesting and receiving content in the form of web pages. The computing device will also typically include a Media Player application 204 which controls playback of a media file and may collect and store certain information regarding the files played. The computing device also typically includes a music library database 206, which is a database used to index the media files on the device (or otherwise accessible to the device), along with containing relevant metadata for each media file, such as song/artist/album metadata, per-song play count metadata, or metadata describing user-authored playlists. The device also typically contains the actual media files 208 described in the database, with these files being in one or more of several common formats (e.g., MP3, WMA, etc.). Note that the media files may be contained on the same computing device as the Media Player application, or may be located on another storage medium accessible by the Media Player application.

Further, in accordance with the present invention, the computing device also includes a social music discovery client 210. Social music discovery client 210 is a software application executed on the computing device to permit multiple such computing devices to share information about their respective media and media usage with each other and with the social music discovery backend 102. Note that client 210 may be a software application that is part of a browser or other application, or may be a separate application executing on the computing device.

As shown in the figure, social music discovery backend 102 includes a web-server middle-tier software application 220 and social music discovery database(s) 222. Web-server middle-tier software application 220 represents one or more web servers in communication with network members' computing devices and configured to receive HTTP (or another suitable protocol based) requests from the web browser software 202 or social music discovery client software 210. The web-server middle-tier application responds to such requests by serving web pages and/or user-interface data over the client/server connection, enabling web-browser 202 to be used to perform certain functions of the inventive system, such as registering for the system, inviting friends to participate, browsing friends' music tastes, etc. The web-server middle-tier 220 also functions to shuttle calls to the social music discovery database (or databases) 222, for example to send a network member's playback/play count data from their computing device for storage and processing to determine compatibility measures, similarity measures, and to generate the music discovery tools that are some of the features of the present invention.

Figure 3:
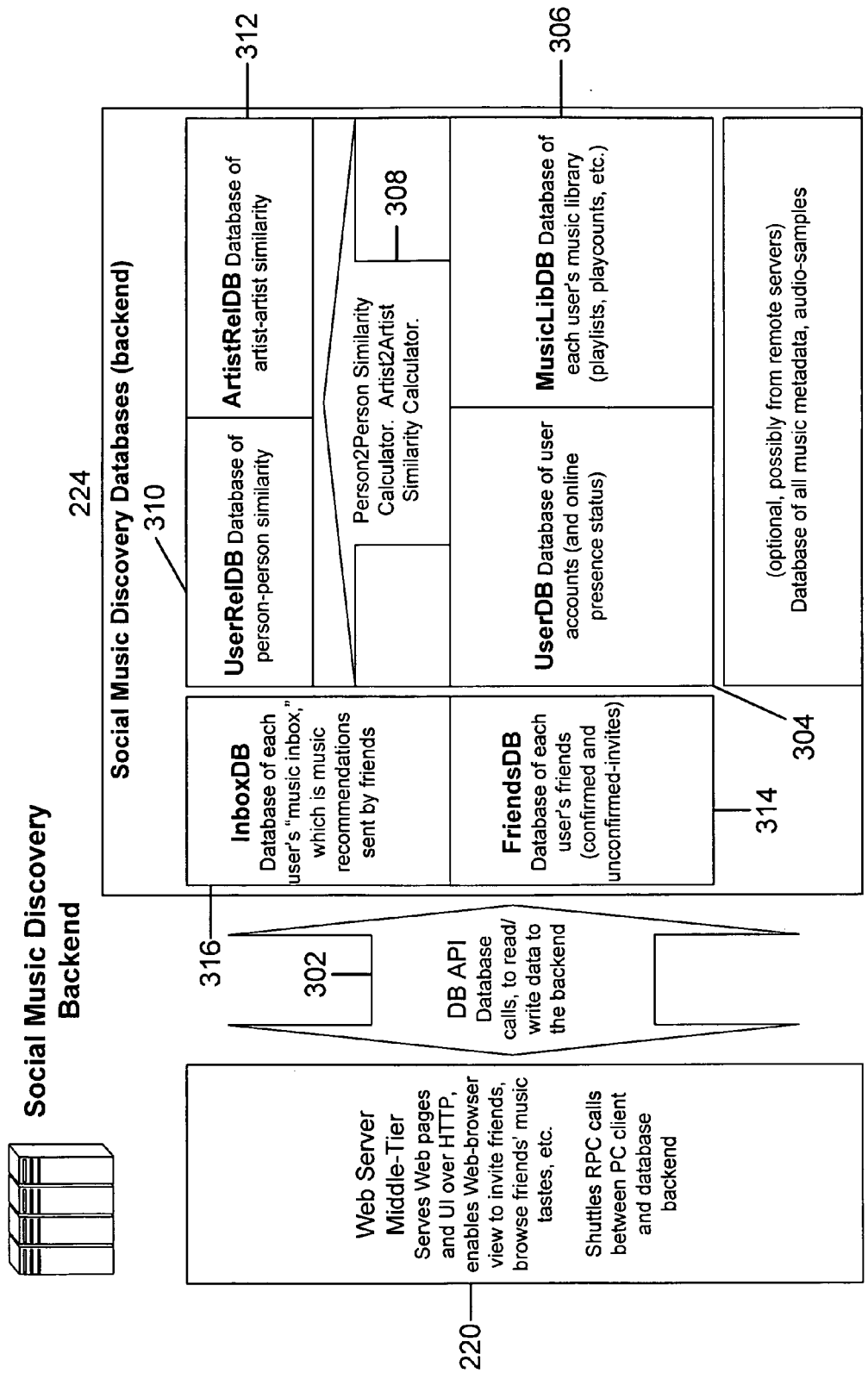
FIG. 3 is a detailed functional block diagram of the social music discovery backend element shown in FIGS. 1 and 2.

FIG. 3 is a detailed functional block diagram of the social music discovery backend element 102 shown in FIGS. 1 and 2. The social music discovery backend 102 is typically implemented as a server or servers that interface with the social music discovery clients in multiple network members' computing devices to collect and process data, and thereby implement the features and services of the present invention. As noted with reference to FIG. 2, social music discovery backend 102 includes web-server middle-tier software application 220 and social music discovery database(s) 222. Web-server middle-tier application 220 is configured to communicate with and transfer data between middle-tier 220 and database(s) 224 via a database application programming interface 302 (shown as DB API in the figure). Database API 302 functions to enable calls to, and exchanges of data between middle-tier 220 and database(s) 224. Social music discovery database(s) 224 will typically include multiple functional elements that cooperatively act to store and process the collected media description and usage data, and thereby provide the services and features of the present invention. The Social music discovery database(s) 224 may thus be characterized as part of a processing platform that includes one or more databases and a data processing module that processes data contained in those databases to produce an output, where the output is a music discovery tool intended to assist a member of the network to discover music of interest to that member.

As shown in the figure, the functional elements contained in the Social music discovery database(s) 224 typically include a database of network member accounts, UserDB 304. This database contains data regarding user account names, status, and monitors which users have installed the social music discovery client (element 210 of FIG. 2), so that data sent back from client 210 is properly associated with the correct network member. UserDB 304 may also include data relevant to determining the presence on the network and/or availability of a member of the network. The functional elements further include a music library database, MusicLibDB 306. MusicLibDB 306 is a database containing all or the relevant portion of the data in each member's music library database (element 206 of FIG. 2), i.e., data regarding each member's songs/albums/artists, and playback activities. Such data may include, but is not limited to, playcounts for each song, the "date-added" to the library, playlists, etc.

Further, the functional elements include processing elements (such as a processor or processing module, microprocessor, state machine, computing element, etc.) capable of executing one or more processes or methods for evaluating the data received from network members and contained in MusicLibDB 306 (and in some cases UserDB 304 and/or other sources). The executed processes or methods are used to determine indicia or measures that suggest that the music or preferences of one network member would be of interest to a second network member (i.e., music discovery tools). An example of these processes or methods is represented by the similarity/compatibility calculators 308 element in the figure. Such processes or methods may include ones for determining the similarity or compatibility between the music tastes of a first network member and a second network member (termed a Person2Person similarity calculator in the figure) or the similarity or compatibility between two musical artists (termed an Artist2Artist similarity calculator in the figure). The processes or methods may be used as the basis for generating recommendations and/or notifications to a network member of their potential interest in musical content contained in the music library of another network member. Such processes or methods (implemented either as part of calculators 308 or as part of another element of the system) may further include processes that filter the music library and playback data to produce outputs indicating music contained in the music library of one or more members of the network that is not contained in the library of a network member, or music that is popular with one or more members of the network but not contained in a network member's library.

Although a variety of similarity or compatibility algorithms or heuristics may be used as part of the present invention, they will preferably have certain characteristics in common. Specifically, the algorithms or heuristics will generally define a metric or metrics of interest and then compute a value of that metric based on the data and meta-data relevant to the music libraries and music listening behaviors of a network member or members. The metric may be calculated for each network member separately and then compared on a network member-to-network member basis, on a network member-to-group basis, or on a group-to-network member basis, for example. The metric may also be calculated as a measure of the similarity or statistical correlation between one group of data and a second group of data (where the data represents network members' musical libraries or parameters characterizing an artist to permit comparison to a second artist). The metric may be defined as a statistical measure, a distance measure, a group membership measure (inclusive, exclusive, relative significance within a group), a relevancy measure, a clustering measure, or other suitable characteristic. The metric may be evaluated as a comparison between two artists, between an artist and a normalized value based on a group of artists, etc.

As an example, a suitable similarity measure is that termed the Cosine-based Similarity measure. In this method, two items are modeled as two vectors in an m-dimensional user-space. The similarity between them is measured by computing the cosine of the angle between these two vectors, which is a measure of the projection of one vector on the other.

Formally, given an m×n ratings matrix where the matrix rows represent users and the columns represent values for the desired characteristic, the similarity between items i and j, denoted by sim (i,j) is given by $$\text{sim }(i,j) = \cos(i,j) = (i \cdot j)/(\|i\| * \|j\|),$$

where "·" denotes the dot-product of the two vectors and $\|i\|$ represents the norm (magnitude) of the vector.

Such an artist-to-artist similarity measure may be implemented as follows:

(1) a database stores data concerning the number of times a user plays a song by an artist—this is defined as playcount (u,a), where playcount is the number of times a user u plays an artist a;

(2) each artist is represented as a vector A in n-dimensional space, where n is the number of users in the system, and A[u]=playcount (u,a); and (3) the similarity between any two artists is computed via vector cosine similarity, so that the artist most similar to a selected artist is the artist whose vector forms the smallest angle in n-space to the artist in question, and the cosine between two vectors is equal to their dot product divided by the product of their magnitudes.

Using such a measure, to calculate the Correlation (or similarity measure) between two artists a1, a2:

a1 dot a2=sum ((playcount (u, a1)*playcount (u, a2)) for all users u, and the magnitude |a|=sqrt (a dot a); and Correlation (a1,a2)=(a1 dot a2)/(|a1||a2|)

Then, in order to determine a list of the artists most similar to a1, find the artists a2 with the largest Correlation (a1,a2) values.

Further, in order to compute a user-user similarity/compatibility measure (i.e., between two members), the following implementation of a cosine-based similarity measure may be used:

the similarity or compatibility between two users u1, u2 is found from u1 dot u2=sum ((playcount (u1, a)*playcount (u2, a)) across all artists (a) contained in the respective music libraries of each user, where |u|=sqrt (u dot u); and the compatibility measure is defined as Compatibility (u1,u2)=(u1 dot u2)/(|u1||u2|).

Note that although the implementations of the cosine-based similarity measure described herein provide beneficial results when utilized as part of the present invention, such implementations are not the only ones that may be utilized. Further, the beneficial results of the present invention may be obtained by use of other similarity measures and/or analysis techniques. Broadly speaking, the calculators 308 process the play count/music-library data for network members and artists (i.e., library contents and usage data) to determine a network member's similarity to (or compatibility with) another network member or other network members, or to discover the similarity between artists listened to by one or more network members. For example, the calculators may process the data to obtain results suggesting that one artist is "similar" to another, and hence that a network member who likes the first artist may like the second, or that network members who listen to a lot of music by both artists are similar to each other (which may be used as the basis for recommending a third artist liked by one network member to the other network member). Such recommendation techniques are similar to collaborative filtering techniques well known in the art, although they may be known by other terms as well.

In addition to the example similarity and correlation measures described, the inventors have developed other measures that may be used within the context of the present invention to provide beneficial results. As an example, the artist-to-artist correlation may be computed using the following method, which is a modification of a type of Cosine-based similarity measure:

Define a multi-dimensional matrix f(L, A), with the matrix having dimensions equal to the number of users of the network times the number of artists represented in the combined music libraries of all users. The value of an element of the matrix is given by the number of times per year that listener L listens to artist A (i.e., the total annual playcount of artist A in listener L's music library). Thus, given a total of (n) users and (m) distinct artists, the matrix has dimensions n×m, and the matrix element in the ith row and jth column, $a_{ij}$, represents the number of times per year that users (that is a particular member/listener) played artist$_j$.

Next, the matrix values are normalized based on the popularity of each artist A to calculate F(L, A), where:

F(L, A)=f(L, A)/Square Root (sum (f(L', A)*f(L', A))), where the sum is calculated across all listeners L'.

Next, the correlation between two artists, A and A', C(A, A') is calculated:

C(A, A')=sum (F(L, A)*F(L, A')) where the sum is again calculated across all listeners, L.

Further, in order to provide more reliable input data in the calculation of C, in addition to listener-playcount data f(L,A), the inventors have recognized that it would be beneficial to incorporate playlist data in the matrix, f(L, A). In this embodiment, the matrix f, and the normalized matrix F are extended to include rows not only for listeners, but also for playlists. In this case the matrix element f(P, A) has a value equal to the number of times a given artist A appears inside a playlist, P. To obtain the playlist data, the inventors use the actual music playlists in the music libraries of the users, supplemented, if desired, by professionally-programmed playlists created by sources such as radio disc jockeys. In one implementation, each playlist P is given a row in the matrix f, and hence contributes to the normalized matrix F, and to the artist-to-artist correlation values. In this way, artists that appear in playlists more often than others are given added weight in the calculations. In addition, these alternate sources of data (such as playlists) may be weighted differently relative to the library-playcount data and to each other. In this regard, the relative importance of each data source may be weighted differently in the calculation of the correlation matrix, C.

Further, in order to reduce the time needed to perform this computation across all users and all artists, a filter may be applied to eliminate data from users and/or artists with low relative playcounts or other data values. For example, when calculating artist-similarity, those users with extremely low relative playback of a particular artist may be ignored to reduce the computation requirements.

The user-to-user (member-to-member) similarity measure may be calculated according to the following method, also developed by the inventors:

Define S(L, L'), to be the similarity between two users L and L'. This value is defined not just by comparing the users' listening habits for a shared artist, but also including the artist-to-artist correlation values between "similar" artists, as follows:

S(L, L')=sum (F(L, A)*C(A, A')*F(L', A'))/SQRT (sum (F(L, A)*C(A, A')*F(L, A'))*sum(F(L', A)*C(A, A')*F(L', A'))), where each sum is calculated over all artists A and all artists A'.

Note that the effect of this modification is to introduce an increase in the calculated similarity/compatibility between a first and second user when those users listen to music from "similar" artists, not just the same artist.

As mentioned, in order to reduce the time needed to perform this computation across all users and all artists, a filter may be applied to eliminate data from users and/or artists with low relative playcounts. For example, in calculating the compatibility between two users one may reduce computation requirements by ignoring those artists that neither user listens to sufficiently to take into consideration.

Further, the above formulas have the following properties:

1. A network member's similarity to himself or herself is 1.0, or 100%. An artist's correlation to himself or herself is 1.0, or 100%;

2. The correlation between artists is symmetric, i.e., C(A, A')=C(A',A). The similarity between two users is symmetric, i.e., S(L, L')=S(L', L);

3. As noted, the similarity between two users is not based only on those users liking the same artists. Two network members can have a high "similarity" measure even if they listen to music by different artists; the correlation between those artists still contributes to the similarity between the network members; and 4. Popular artists do not overwhelm/distort the calculation, even though they typically get played the most by all listeners.

The social music discovery databases 224 further include a database storing the metric or metrics values (e.g., similarity, distance or the like) between pairs of network members, termed a UserRelDB 310 in the figure (and labeled "S" in the previous calculation). In addition databases 224 include a database storing the metric or metrics values (e.g., similarity, distance or the like) between pairs of artists, termed a ArtistRelDB 312 in the figure (and labeled "C" in the previous calculation). That is, the value of the defined metric or measure is available for each pair-wise combination of network members or artists. Note that this also permits a value of the metric or measure to be generated between a network member and a group of network members (by properly combining the pair-wise values between the network member and each network member in the group), or between an artist and a group of artists.

In addition, databases 224 include a database of each network member's "friends", termed a FriendsDB 314 in the figure. This database stores data regarding "invitations" sent by one member of the social music discovery network to another person, inviting them to become a member of the network, or if a member of the network, to become a "friend" (meaning that they exchange certain information or data). An invitation remains unconfirmed until the invitee confirms or accepts it. Among other things, FriendsDB 314 keeps track of the state of these invitations.

Databases 224 also includes a "Music Inbox" for each network member, which stores music recommendations for that network member, termed InBoxDB 316 in the figure. Among other things, InBoxDB 316 contains music recommendations sent by that network member's friends, where such recommendations may be suggested as the result of the data processing activities of the present invention. Recommendations may contain an artist, song, album, or playlist sent as a recommendation from one network member to another network member. For example, a recommendation based on a similarity or compatibility measure may include a portion of a song, a down sampled version of a song, or another processed form of a song.

The messages/songs in a network member's Music Inbox include recommendations from friends as well as recommendations generated by the inventive system itself. The first type of recommendation (recommendations from friends) are sent based on user action, for example if a user clicks a link to "recommend this song to a friend", or if a user uses a drag-drop operation to drag a song from their music library to a visual display of their friend's library or inbox. Such a recommendation may result from a user viewing a list of those songs contained in their own library but not contained in a friend's library, for example. The second type of recommendation (those generated automatically by the system) are typically generated by one of two methods: (a) looking at a user's most-played artists/songs and recommending artists/songs with high correlation values (high degree of artist-to-artist similarity); or (b) looking at a user's network of friends (or strangers with similar music tastes) and recommending artists/songs that are played the most within that group or network (filtered to remove songs already contained in the user's library if desired).

The Music Inbox stores a list of recommended songs for each network member, as well as data about where the recommendation came from—from a particular friend, a group of friends, or based on the network member's listening habits. The Music Inbox may optionally store a rating—allowing the network member to rate each recommendation as a good or bad (helpful or unhelpful) recommendation. It may also enable sampling of the music, either by linking to a streaming clip of the song, or by including a stored, clipped portion or down-sampled rendition of the song. Note that the process of generating recommendations/music discovery tools may be adapted by taking into account the ratings assigned to a recommendation by a network member. For example, future recommendations from the originators of previously highly rated recommendations may be given added weighting or filtered to make them more likely to be provided. In addition, future recommendations of artists similar to ones that were previously highly rated by a network member might be more likely to be provided.

Figure 4:
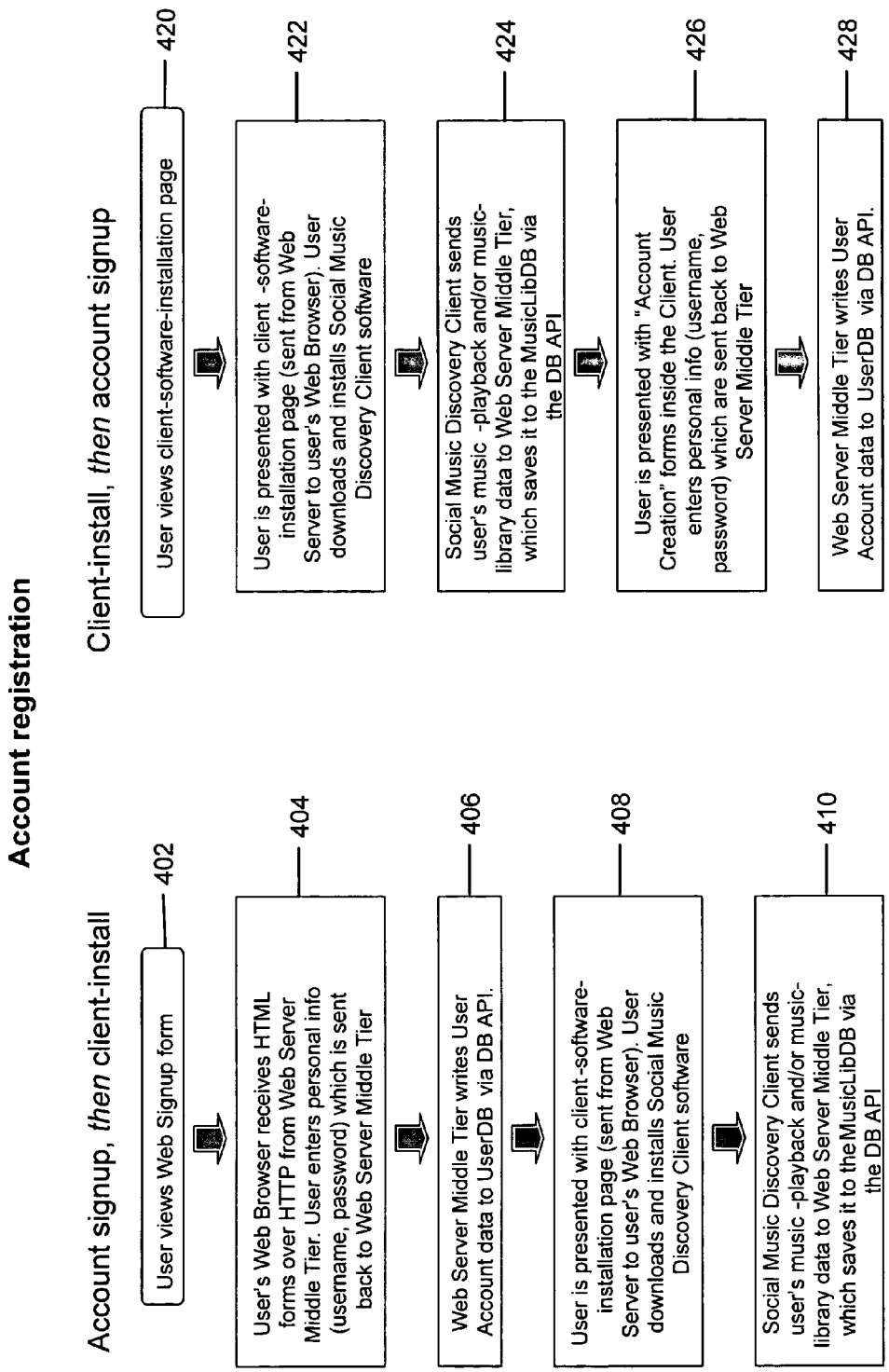
FIG. 4 is a flowchart showing an example of the primary steps in the account registration and client-installation processes of the social music discovery network of the present invention.

FIG. 4 is a flowchart showing an example of the primary steps in the account registration and client-installation processes of the social music discovery network of the present invention. Two scenarios are depicted in the figure; (1) registration followed by installation of the social music discovery client (the sequence of stages depicted on the left side of the figure); and (2) installation of the social music discovery client followed by registration (the sequence of stages depicted on the right side of the figure).

In the account registration followed by client software installation scenario, the user navigates to a web page for the social music discovery network and views the registration form (stage 402). The user then initiates the registration process (stage 404) by providing a username (e.g., their email address) and password, accepts the terms-of-use for the service, and may provide additional personal information (e.g., location, gender, etc.) if desired. The data entry may be facilitated using a series of forms (perhaps aided by executable scripts that facilitate the data entry and processing) to collect data from the user. The forms may be displayed either in HTML or another suitable markup language (served from the web-server middle-tier to the user's browser), or as forms displayed directly within another suitable application. The data from the forms is stored in UserDB 304, where the new user account may be saved as a new row in the database (stage 406).

Following the registration process, the user is presented with a web page that may be used to initiate the download and installation of the social music discovery client software (stage 408). The user then downloads and installs the client software on their local computing device. Upon installation, the client software provides data about the user's music library and music-listening habits to the social music discovery backend (stage 410). The data may include song-by-song playback data and/or the user's entire music library database (which stores the meta data for all artists/albums/songs/playlists and playcounts of each). This data is sent from the Social Music Discovery Client, received by the Web Server Middle Tier, and saved to the MusicLibDB 306.

The data may be provided regularly by, for example, one or both of the following two methods: (1) playback data may be sent from the client to the server backend each time a song is played on the user's device; or (2) the entire library database may be sent from the user's device to the server backend on a regular schedule (such as every week). Furthermore, once this data has been collected on the server, it may be used to calculate the user's similarity to their friends, or to determine strangers with similar music tastes, etc.

In the installation of the social music discovery client software followed by registration scenario, the user navigates to a web page for the social music discovery network and views a client installation instructions (stage 420). The user is presented with a web page that may be used to initiate the download and installation of the social music discovery client software (stage 422). The user then downloads and installs the client software on their local computing device. Upon installation, the client software provides data about the user's music library and music-listening habits to the social music discovery backend (stage 424). The data may include song-by-song playback data and/or the user's entire music library database (which stores the meta data for all artists/albums/songs/playlists and playcounts of each). This data is sent from the Social Music Discovery Client, received by the Web Server Middle Tier, and saved to the MusicLibDB 306.

The user then registers with the social music discovery network by providing information requested by forms presented through the social music discovery client (stage 426). This typically involves providing a username (e.g., their email address) and password, accepting the terms-of-use for the service, and possibly additional personal information (e.g., location, gender, etc.) if desired. As mentioned, the data entry may be facilitated using a series of forms (perhaps aided by executable scripts that facilitate the data entry and processing) to collect data from the user. The forms may be displayed either in HTML or another suitable markup language (served from the web-server middle-tier to the user's browser), or as forms displayed directly within another suitable application. The data from the forms is stored in UserDB 304, where the new user account may be saved as a new row in the database (stage 428).

Figure 5:
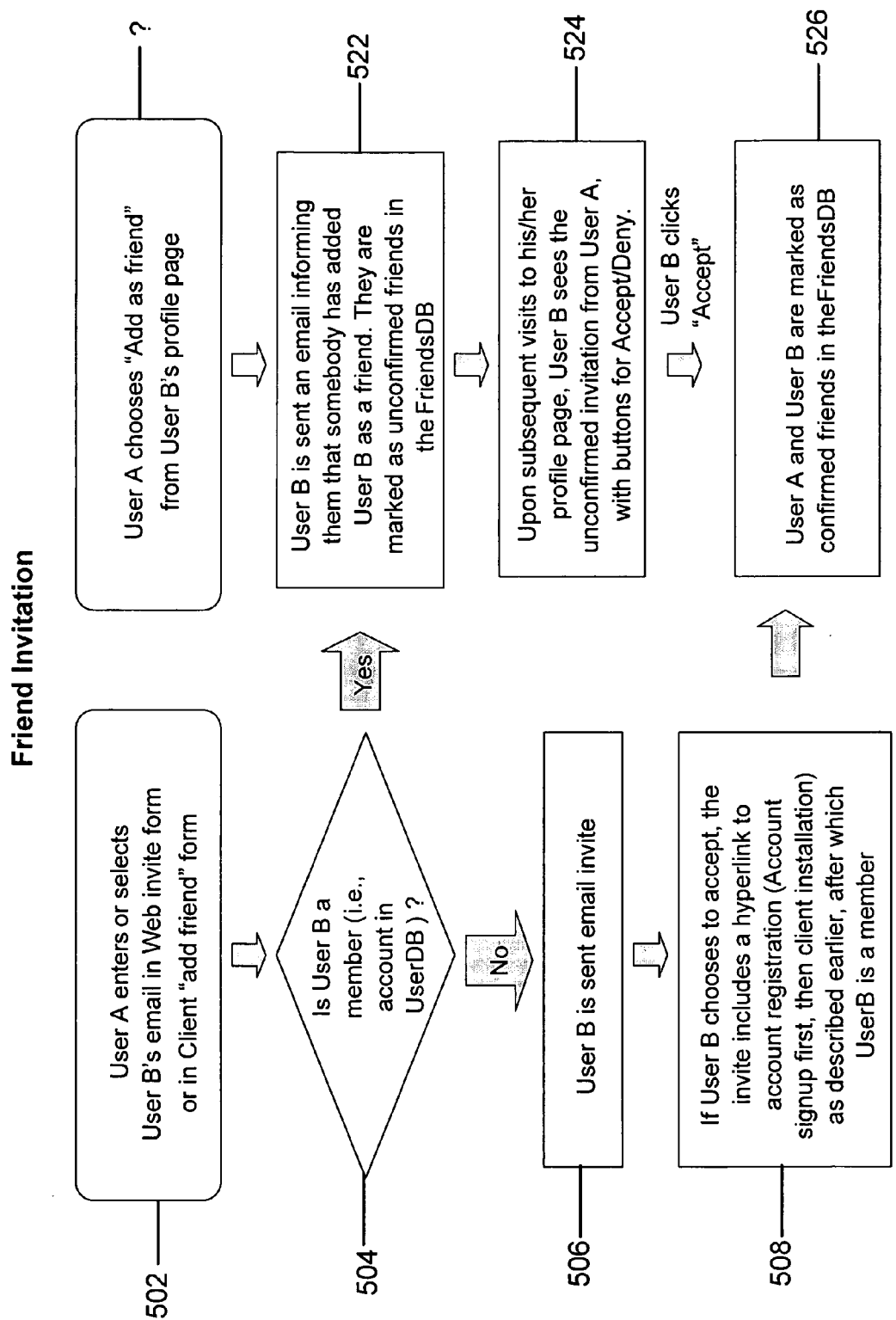
FIG. 5 is a flowchart showing an example implementation of a process to invite a friend to be granted access to a network member's social music network, in accordance with the present invention.

Upon registration, or at a later date, a network member may wish to "invite" a friend or acquaintance to become a member of the network, or if already a member, to become linked as friends within the network. FIG. 5 is a flowchart showing an example implementation of a process to invite a friend to be granted access to a network member's social music network, in accordance with the present invention. As shown in the figure, the process starts with a first network member (User A in the figure) selecting a friend or acquaintance (User B in the figure) whom they wish to either invite to join the network, or if already a member, to become linked within the network (stage 502). This may be accomplished, for example, by selecting User B's email address from an invitation form (if not yet a member of the network), or from an "add friend" form presented by the social music discovery client. The system then may determine if User B is already a member of the network, typically by determining if User B's email address is found in the user account database for the network (stage 504).

If User B is not presently a member of the network (the "No" branch in the figure), then User B is sent an invitation to join the network via email (stage 506). The invitation will typically include a hyperlink that can be used to initiate the registration process, followed by the software client installation process (stage 508), as described previously with reference to FIG. 4. Upon installation of the client software, User B will become a member of the network, and User A and User B are confirmed as friends in the friends database (stage 526). If User B is presently a member of the network (the "Yes" branch in the figure), then User B is sent a message informing them that another member of the network has designated them as a "friend (stage 522). In such a case, the system will associate User A and User B as unconfirmed friends in the friends database. Upon visiting their user profile page for the network, User B will be notified of the invitation and offered the opportunity to accept or reject the invitation (i.e., "accept" or "deny" the invitation, as shown at stage 524). If User B accepts the invitation, then User A and User B are confirmed as friends in the friends database (stage 526).

Note that there are at least two different ways to invite people to join the network. The first method (the upper-left box in the figure) involves inviting a friend by providing their email address—that friend may or may not already be a member of the social network. The second method (the upper-right box in the figure) involves finding a profile page within the network and asking that existing-member to become a friend. Note that at a relevant stage in the invitation process (e.g., after stage 526), the system may be configured to calculate the music compatibility between the friends and display that result and/or notify them of their music compatibility measure. Further, a list of songs and/or artists common to both parties may be provided with the music compatibility measure or independently of the measure. This list may be obtained by determining those songs/artists that contribute the most to the compatibility measure.

As noted, the present invention is designed to facilitate the discovery of music or other content between members of a social network. This is accomplished by collecting and processing data regarding the items contained in network members' music libraries and also data regarding the use of those libraries (e.g., listening habits). Such data may include, but is not limited to the following:

Songs contained in the music library;
Artists contained in the music library;
Date added to library for each song and/or artist;
Playcount for each song and/or artist;
Play date/time/frequencies for songs/artists; and
Identification of, or information regarding, a song or artist currently being played by a network member's media player.

Note that the data collected for each member of the network may include one or more of the above described data types, and further, that the same data type(s) need not be collected for each member (thereby permitting a first set of data types to be collected for a first network member and a different set of data types to be collected for a second network member). In addition to the above data, the invention calculates similarity/compatibility measures:

A user-to-user or network member-to-network member (pair wise) similarity/compatibility measure; and
An artist-to-artist (pair wise) similarity measure.

Note that although the measures are described as being calculated between first and second network members (or first and second artists), the measures may also be calculated between a first member (or artist) and a group of members (or artists), between a group of members (or artists) and a second member (or artist), or between a first group of members (or artists) and a second group of members (or artists). The processed data and similarity/compatibility measures may then be used with collaborative recommendation/filtering techniques, other filtering techniques (ranking, threshold, removal of music already present in the library of a member or group of members, etc.), and set membership concepts (union, intersection, difference) to generate music discovery tools and other information of value to the members of the network. For example, using the song/artist data, possible outputs of the invention (some of which will be discussed in greater detail) include:

What songs/which artists a first network member has that a second network member does not have;
What songs/which artists a second network member has that a first network member does not have;
What songs/which artists are popular with a first network member;

What songs/which artists are popular with a second network member;

What songs/which artists are popular with a first network member that a second network member does not have;

What songs/which artists are popular with a second network member that a first network member does not have; and Which network member is the first, biggest, or most recent fan of a particular artist or song?

The combination of the collected data, derived similarity/compatibility measures, collaborative filtering techniques, filtering mechanisms, and set membership concepts (in addition to other processing and/or filtering techniques) can be used by the inventive system, alone or in combination, to help network members discover music that is expected to be of interest to them. The system can generate recommendations automatically by looking at a network member's friends or a group of network members having "similar" musical tastes or other qualities, or the system can assist a network member to manually discover music (e.g., by browsing through their friends' libraries or browsing the libraries of strangers with similar music tastes, in conjunction with the application of various filtering mechanisms to the data).

For example, the system may "automatically" generate one or more of the following types of outputs, recommendations or music discovery tools, either directly or as a combination of more than one of the indicated filtering/processing steps:

Show a network member the artists most similar to the artists he already listens to;

Show a network member the songs most similar to the songs he already listens to;

Filter the result to only show music that the network member doesn't already own;

Show a network member the artists/songs most-played among his group of friends, or most-played within the recent past;

Show a network member the artists/songs most-recently-added to the libraries of his friends;

Filter the result to remove music that the network member already owns;

Re-order the result to display first the music that most closely matches the network member's existing listening habits; and Repeat the above processes, but apply them beyond the member's group of friends to include strangers or another group that share the member's listening habits.

Examples of "manually" generated outputs, recommendations or music discovery tools that may be produced, either directly or as a combination of more than one of the indicated filtering/processing steps include:

Show a network member's friends, and a music compatibility/similarity measure between the network member and each friend—if desired, add a list of common artists/songs;

Show a network member a list of strangers with relatively high music compatibility/similarity measures between the member and those on the list;

Allow a network member to click on each friend/stranger to see their music listening data (most-played, recently-played, or recently-added songs/artists); and Filter the result to show only music that the network member doesn't already own.

Note that, where applicable, the results may be re-ordered to display first or most prominently feature the music (or persons) that most closely match the network member's existing listening habits or musical tastes.

For example, in order to allow a first network member (User1) to see the songs that another network member (User2) is listening to and that may be of more than nominal interest to the first network member, the following method may be used. The intention is to determine the set of User2's songs that User1 doesn't own, but that fit well with User1's tastes.

The specific method for calculating this set of music is as follows:

take all of User2's songs; and subtract all songs that are already present in User1's library.

This is the set of "User2's songs that User1 doesn't have yet" and represents a difference operation between the respective set elements.

Next, the set data is processed to sort them into a particular order, in this case to show the set of User2's songs that Use1 doesn't have, presented to Use1 in order of "songs most likely to fit your tastes".

To perform the sort, the method uses the artist-to-artist correlation matrix C, where C(A1, A2) is the correlation between artists A1 and A2, and the user-playcount database, where Playcount(User, Artist) is the number of times a particular user/network member plays a particular artist A possible sorting algorithm is as follows:

taking the set of "User2's songs that Use1 doesn't have yet";

for each song S by artist A in the set, assign a sorting magnitude which is defined by taking Use1's playcount for the song and multiplying by User2's playcount for all correlated artists (note that although the algorithm is designed to compute the value based on all correlation values, for the sake of computational efficiency, a filter may be applied so that only relatively high correlation values are used in the computation).

thus, the sorting magnitude of song S, artist A=Playcount (Use1, S)×sum (C(A, A')*Playcount (User2, A')) across all artists A';

Then, sort the set of User2's songs that Use1 doesn't have by their sorting magnitude. This yields a sorted list: all of User2's songs that Use1 doesn't own (yet) but that match Use1's tastes (as suggested by playcount data and artist-to-artist correlation measure).

A benefit of this approach is that a person can look at a friend's library and the inventive methods will automatically suggest which songs from the friend's library are likely to be the most interesting to sample. Note that the method automatically discards music that Use1 already owns. Of the remaining music, a song is assigned higher weight if User2 listens to it a lot (in other words it gives weight to User2's favorite songs), but it also compares each song to Use1's likelihood of enjoying it (based on comparing to Use1's historical playcounts for that artist and similar artists). Thus, this method highlights songs that Use2 listens to a lot and that are also a good fit with Use1's listening habits, and it deemphasizes songs that Use2 doesn't listen to very much, or songs that don't fit Use1's listening habits.

The inventive system utilizes similarity/compatibility measures, filtering mechanisms, set membership concepts, and data regarding network members' music libraries and listening habits to generate a set of music discovery tools. These tools include messages containing recommendations and other outputs that assist in the discovery of music for a network member or group of members. As has been described, the recommendations or other outputs may be based on set analysis (what one network member has in their library that another does not and would be of interest), identification of a "fan" of a certain artist or style of music, or another suitable filter or heuristic.

In order to provide the data required for computation of the compatibility or similarity measures, and generate the recommendations and other music discovery tools, the system is designed to access the data contained in the music library database (MusicLibDB, element 306 of FIG. 3) and process that data to generate the desired measures or outputs. This may be accomplished, for example, by regularly (e.g., daily, weekly, or upon detecting a certain degree of change within the database contents) processing the database data to produce the desired measures (e.g., the Person2Person Similarity measure and/or Artist2Artist Similarity measure; see element 308 of FIG. 3). The "calculators" responsible for generating these measures are software routines executed on the data contained in the databases of artists and users/network members (elements 304 and 306 of FIG. 3). The results of the compatibility and similarity measures are used to populate the person-to-person similarity database (UserRelDB, element 310 of FIG. 3) and the artist-to-artist similarity database (ArtistRelDB, element 312 of FIG. 3). As mentioned, these databases store the similarity/distance measure between pairs of network members (where for this purpose, a "network member" may be an individual or group) and between pairs of artists (where again for this purpose, an "artist" may be a single artist or a group of artists).

Note that in addition to the described measures, the compatibility or similarity measure can be any relevant metric, definable as some computation or relationship over the set of processed data. Typical metrics applicable to the present invention include generalized norms, "distance" measures which provide a value indicative of the relative separation of two sets of data, normalized value metrics, ranking metrics which provide an indication of the ordering of sets of data, as well as set membership based metrics which provide an indication of relationships between sets of data (such as intersection, union, and related concepts).

Typically, the relevant metric is computed for each pair-wise combination of network members (or between an individual and group) and between each pair-wise combination of artists (or between a single artist and group of artists). The resulting values for the relevant metric (or metrics) can then be compared, subjected to a threshold operation, filtered, subjected to a clustering analysis, or otherwise processed to determine whether the results indicate a likelihood that one network member (or group of network members) would be interested in the musical tastes of a second network member (or group of network members). For example, given the metric values, the system can determine which pairs of network members have a sufficiently close similarity in musical tastes to be interested in each other's music library contents. Likewise, given the metric values, the system can determine which artists are sufficiently close in similarity to each other to warrant suggesting that a network member interested in one artist might be interested in the other. Note that collaborative recommendation/filtering algorithms and heuristics may be used to generate recommendations of additional songs and/or artists based on similarity/compatibility between the two network members, supplemented if desired, by data indicating a similarity between two artists. For example, a network member who has sufficient similarity with a second network member might be interested in an artist currently unknown to them because that artist is popular with the second network member. In addition, the network member might also be interested in an artist because that artist is similar to an artist that is popular with the second network member (or with themselves).

As further examples of the possible results that may be obtained from the inventive system, the following sections describe exemplary outputs of the data processing that represent music discovery tools which may be used to suggest an interest in the musical tastes of one network member by another network member. These include indicating to a network member music contained in another network member's (or group of network members) music library (or libraries) that is not in their own library, indicating music that is popular with one network member that is not known to a second network member, or indicating which network member is the first, newest or biggest fan of a particular song or artist.

The system may also be used to indicate for a given artist those songs popular with a first network member or group of members that are not presently in the music library of a second network member. Further, the system may also be used to indicate for a network member those artists/songs that are similar to those popular with the network member, but that are not presently contained in the network member's music library. The system may also be used to show a network member music contained in their own library that is not contained in the library of a second member (or group of members) of the network.

Figure 6:
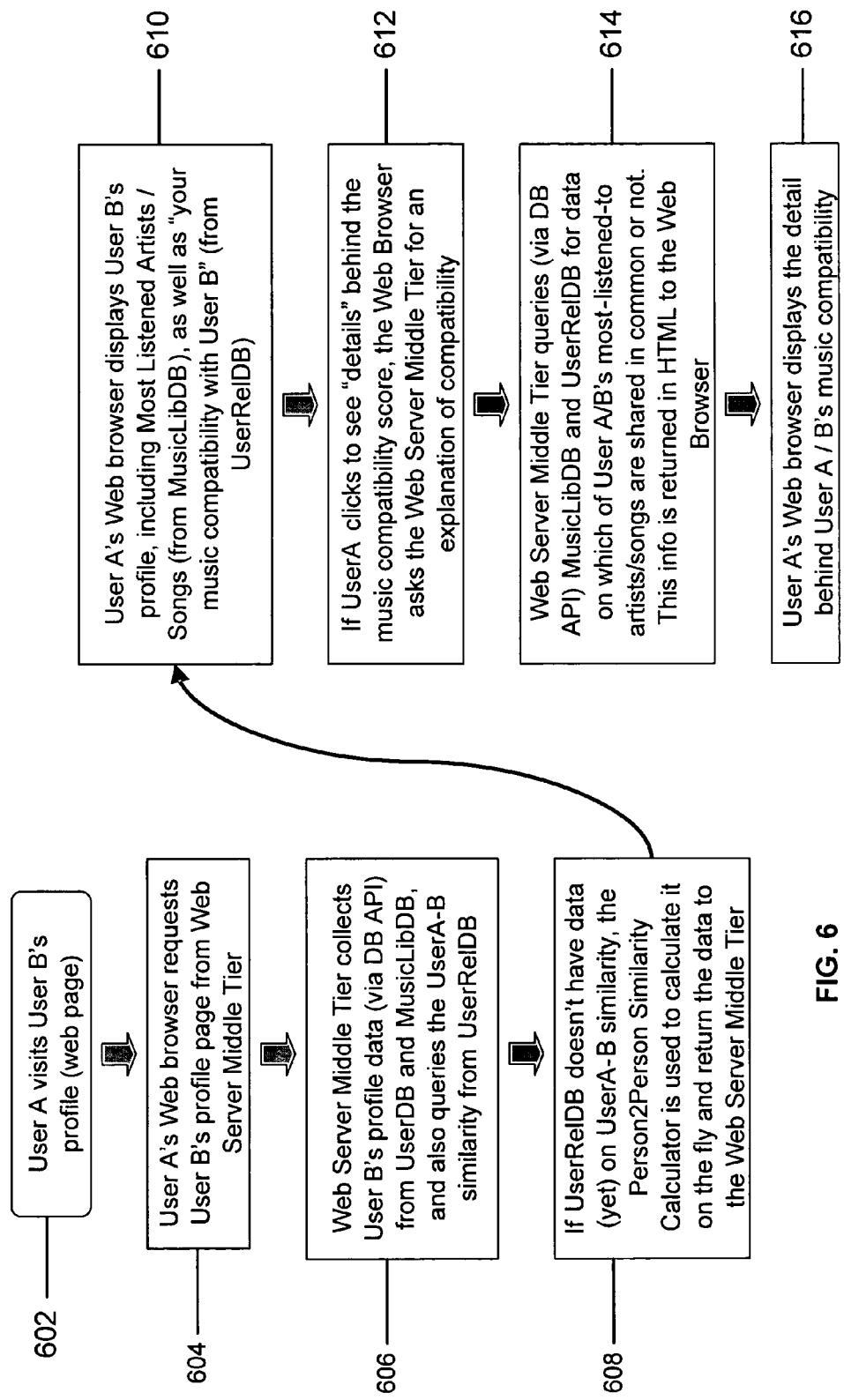
FIG. 6 is a flowchart showing an example of the primary steps in the generation and display of a compatibility measure between two members of the social music discovery network of the present invention.

One possible output of the system represents a measure of the compatibility of one network member's musical interests to those of another network member. FIG. 6 is a flowchart showing an example of the primary steps in the generation and display of a compatibility measure between two members (or between a member and a group, or between two groups) of the social music discovery network of the present invention. The depicted process is based on a database query to the UserRelDB (element 310 of FIG. 3), which contains the values for the compatibility measure between any two network members (i.e., the pair-wise calculations of the measure). The calculation of the compatibility measure is performed in accordance with any suitable heuristic or algorithm, although as noted, in one implementation the inventors have utilized a form of a cosine-based similarity measure, either alone or as modified to account for the correlation between artists. Because this calculation is performed routinely to update the UserRelDB 310, it is likely that a value for the compatibility between any two network members is available in the database. However, if it is not available, the Person2Person Similarity Calculator (element 308 of FIG. 3) may be used to calculate the measure, and to update the UserRelDB 310. In addition, it is possible to query the system for the "details" or explanation behind the music compatibility measure, which can result in a visual display of the most-listened-to artists/songs that are shared (or not) between the two network members (as will be described in greater detail with reference to FIG. 7). Note that in addition to showing the compatibility measure between two network members, it may be desirable to provide a list of those songs/artists common to the music libraries of the two network members. One way to generate such a list is to determine the artists that contribute the largest amount to the overall network member-compatibility score.

As shown in FIG. 6, the process may begin with a first member of the network (User A) navigating to the social music discovery network web page of a second network member (User B), as shown at stage 602. User A's browser then requests the profile page of User B from web-server middle-tier (element 202 of FIG. 2), as shown at stage 604. Web-server middle-tier then accesses the profile data for User B (via calls and data exchanges using the database API, element 302 of FIG. 3), where this profile data may include data contained in UserDB (element 304 of FIG. 3), MusicLibDB (element 306 of FIG. 3), and the similarity measure for the User A-User B pair contained in UserRelDB (element 310 of FIG. 3), as shown at stage 606. The profile data will typically contain information about the network member and their musical tastes and/or listening habits, as well as the noted similarity measure. As mentioned, if the UserRelDB 310 does not contain the requested similarity measure (or if it contains a "stale" or otherwise unsuitable value for the measure), the Person2Person Similarity Calculator may be used in realtime to calculate the measure, and to update the UserRelDB 310, as shown at stage 608.

Upon accessing the profile data, User A's browser displays all or certain aspects of User B's profile. Such aspects may include, but are not limited to, User B's most listened to artists and/or songs, as well as a music compatibility score, indicating a measure of the likely compatibility of the music tastes or interests between the two network members, as shown at stage 610. If User A desires additional information regarding the basis for the compatibility score or measure, they may request such information via their browser, which will query the system for an explanation (via the web-server middle-tier and database API, as shown at stage 612). In response, the web-server middle-tier queries (via the database API) the MusicLibDB and UserRelDB to obtain data needed to determine the relation between the musical interests and tastes of the two network members. This determination may be made in several ways. For example, it may be determined by identifying which of the two network member's most listened to artists and/or songs are shared between the two network member's musical libraries, indicating a more likely compatibility; the system may also identify which of the two network member's most listened to artists and/or songs are not shared between the two network member's musical libraries, indicating a less likely compatibility (as shown at stage 614). This information is provided to User A's browser and displayed for User A's viewing (at stage 616).

Figure 7:
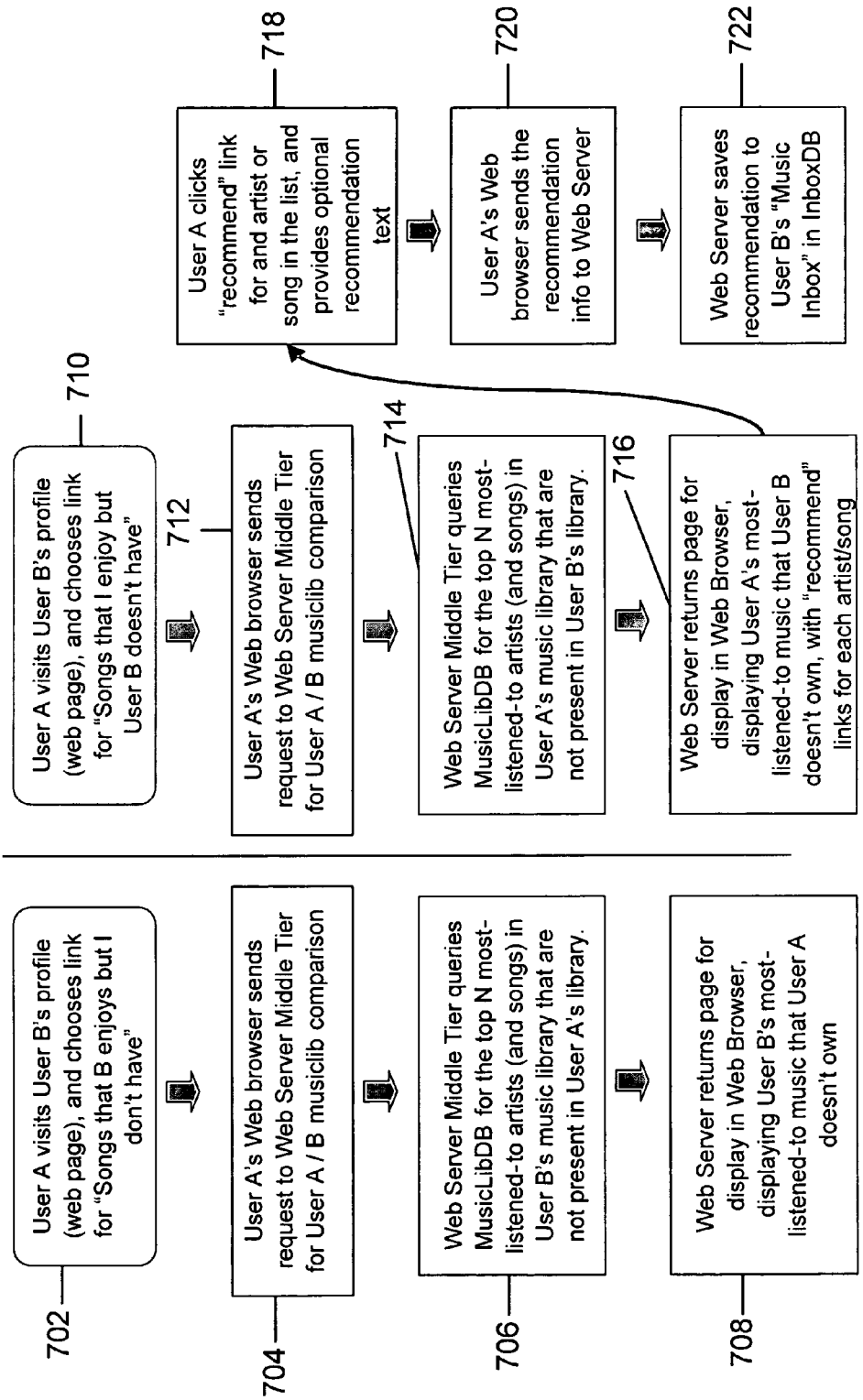
FIG. 7 is a flowchart showing an example of the primary steps in the generation and display of a first recommendation feature (or music discovery tool) between two members of the social music discovery network of the present invention.

As another example of the possible outputs and music discovery tools that may be obtained from the inventive system, FIG. 7 is a flowchart showing an example of the primary steps in the generation and display of a first recommendation feature (or music discovery tool) between two members of the social music discovery network of the present invention. This feature is based on determining which artists or songs are popular with a first network member (or group), but are not presently known to or popular with a second network member (or group). This may be accomplished by determining which artists or songs that are popular with a first network member (or group) are not contained in the music library of a second network member (or group).

As shown in the leftmost column of FIG. 7, the process may begin with a first network member, User A, accessing the profile of a second network member, User B, and selecting a link to "Songs that B enjoys but I don't have", or another similar expression of the concept (stage 702). This may be determined by User A's browser sending a request to the web-server middle-tier for a comparison of the music libraries of the two network members (stage 704). One way of implementing this feature is to submit a database query to request the most-listened-to music in User B's music library, and then to determine which of those songs/artists are not present in User A's music library (stage 706). As shown in the figure, at stage 706, the query may be constructed to determine the N most listened to artists or songs that are in User B's music library but are not presently in User A's music library. The web-server may then return a web page for display using User A's browser that shows those artists and/or songs that are most popular with User B but are not presently contained in User A's music library (stage 708). Note that for improved efficiency and speed, this and other queries described herein may be written as a "stored procedure" for the MusicLibDB.

Similarly, as shown in the center column of FIG. 7, the process may used to determine those artists and/or songs contained in User A's music library and popular with User A that are not contained in User B's music library. The process may begin with a first network member, User A, accessing the profile of a second network member, User B, and selecting a link to "Songs that I enjoy but B doesn't have", or another similar expression of the concept (stage 710). This may be determined by User A's browser sending a request to the web-server middle-tier for a comparison of the music libraries of the two network members (stage 712). One way of implementing this feature is to submit a database query to request the most-listened-to music in User A's music library, and then to determine which of those songs/artists are not present in User B's music library (stage 714). As shown in the figure, at stage 714, the query may be constructed to determine the N most listened to artists or songs that are in User A's music library but are not presently in User B's music library. The web-server may then return a web page for display using User A's browser that shows those artists and/or songs that are most popular with User A but are not presently contained in User B's music library (stage 716). The presented page may include a link or other means to initiate a process of preparing and sending a recommendation (or other type of processing output that assists in the discovery of music or other content) to User B for those songs popular with User A that are not currently contained in User B's music library (again at stage 716). If User A desires to send such a recommendation, they may activate a "recommend" link associated with a particular artist or song, and may be requested to provide text providing the recommendation (stage 718). In response, User A's browser sends such recommendation data to the web-server middle-tier (stage 720). The web-server middle-tier may then execute a process or processes needed to provide the recommendation to User B's social music discovery network music inbox (InboxDB element 316 of FIG. 3), at stage 722.

As yet another example of the possible outputs that may be obtained from the inventive system, FIG. 8 is a flowchart showing an example of the primary steps in the generation and display of a second recommendation feature (or music discovery tool) between two members of the social music discovery network of the present invention. This feature is based on determining which network member or network members are the first fan, biggest fan, or most recent listener(s) of a particular artist.

As shown in the leftmost column of FIG. 8, the process may begin with User A accessing the profile page for Artist X (stage 802). User A's browser requests the profile page/data from the web-server middle-tier (stage 804). As part of responding to the request, the web-server may perform one or more queries designed to identify which among User A's friends is the first fan, biggest fan, or most recent listener of the specified artist (stage 806). For example, as shown in the middle column of the figure, the query may be designed to determine at what date each of User A's friends (that is for each User B listed among User A's friends in the friends database, FriendsDB) added the artist in question to their respective music library (stage 808). The friend who added the artists at the earliest date would be returned as the "first fan" or "earliest fan".

Similarly, as also shown in the middle column of the figure, the query may be designed to determine which of User A's friends (that is for each User B listed among User A's friends in the friends database, FriendsDB) listens to the specified artist most frequently (stage 810). The friend who listens to the artist most frequently would be returned as the "biggest fan".

Further, as also shown in the middle column of the figure, the query may be designed to determine which of User A's friends (that is for each User B listed among User A's friends in the friends database, FriendsDB) most recently listened to the specified artist (stage 812). The friend who listened to the artist most recently would be returned as the "most recent listener".

The web-server combines the responses to the requested queries as they relate to the specified artist (i.e., Artist X in the figure) and returns that information to User A for presentation by User A's browser (stage 814), either as part of the Artist profile page or as a separate page. Note that each of the queries are database queries (via the DB APIs) to the FriendsDB (which stores all of User A's friends) and MusicLibDB (which stores the full music library and playcount and date-added data for all network members).

The data collected and stored by the inventive system in the social music discovery databases (element 224 of FIG. 2) may be used to generate a variety of useful music discovery tools. For example, using the User Database (element 304 of FIG. 3), the Music Library Database (element 306 of FIG. 3) and appropriate filtering mechanisms, the system may be used to determine, for a specified artist, the most popular songs enjoyed by other members of the network that are not presently contained in the music library of a network member (based on playcount data for that artist contained in the music library database for other members of the network and the network member's own music library data).

Similarly, the system may be used to recommend to a network member artists and/or songs similar to that network member's favorite artists/songs and that are not currently contained in the network member's music library (based on playcount data for that network member and artist/song similarity measures, as filtered by the contents of the network member's music library). In these ways the inventive system may be used to generate outputs (i.e., music discovery tools) that assist a network member to discover music that is expected to be of interest to them. These outputs include recommendations as well as indications of music that is present in the music libraries of other members of the network (such as friends or a group with similar interests), but not in the library of the network member (where such results may be filtered by emphasizing music that is popular with other members and/or similar to artists contained in the network member's library, for example).

In addition to the data mining and analysis methods described, the inventive system may be used to facilitate novel business models. The inventive system provides data characterizing a network member's music library and listening tastes. This data, combined with relevant processing methods, may be used to generate recommendations/suggestions for the purchase of music by known or previously unknown artists, or specific songs. For example, the system may be configured to generate notifications that a new artist or song by an established artist would be of interest to a network member (and if desired, indicate a purchasing method). The recommendation may be based on an analysis of the network member's music library, listening tastes (e.g., to determine the network member's favorite artists or songs), and if desired, similarity measures that indicate a "closeness" between an artist enjoyed by the network member and a second artist. Similarly, the inventive system may be configured to notify a network member of related content (e.g., ringtones, concert-tickets, videos, posters, etc.) that may be of interest based on that network member's favorite artists/songs, currently playing artist/song, and/or relevant similarity measures.

For example, in one embodiment of the invention, a network member may be provided with recommendations/notifications (via email, the network member's music inbox, or other means) for new album releases, ringtones, tickets, posters, etc. from his most-listened-to artists or currently playing artist. In another embodiment of the invention, such recommendations/notifications may be displayed within the Music Discovery Client in a format that is contextually related to the content being played by the network member's media-player; for example by displaying ringtones, tickets, or offers directly relevant to the music currently playing in the media player. Note that such contextually related recommendations/notifications may be directly related to the content being played (e.g., for the same artist) or may be indirectly related (or even unrelated) to the content being played (e.g., for a "similar" artist or type of music, or for one of the network member's most popular artists). To facilitate this implementation, the Music Discovery Client may send the backend server data about the "now playing" song/artist (the song or artist currently being played by a network member's media player) and receive back and display a list of contextually related recommended products (ringtones, tickets, posters).

Note that the contextually related products/content may be determined based on an artist similarity measure, as well as by other, market-related means. Such market-related means include, but are not limited to, auction pricing (similar to Google™ AdWords), i.e., advertising products related to the now-playing song (or an artist popular with the network member), with presentation and/or sorting based on the bid each advertiser is willing to pay for placement and presumed clicks on their contextual ad. Note that the contextually-related products and advertisements may also be displayed as a summary of offers relevant to some or all of the most-listened-to artists of the network member.

Although the present invention has been described with reference to example embodiments, it is noted that practice of the invention is not limited to those embodiments. For example, the inventive system may be utilized with any suitable or relevant similarity or compatibility measure or analysis means. Further, the inventive system may be configured to utilize the collected data and processing methods to identify artists or songs of interest to one member of the network based on any of a multitude of factors, including, but not limited to, popularity (as indicated by playcounts, for example), similarity with other artists or songs, inclusion or exclusion from another member's music library, similarity to the listening tastes of a group of members, etc. In addition, as noted, the inventive system may utilize collaborative filtering or other relevant recommendation methods to generate recommendations to a member of the network, where such recommendations may be delivered to the network member's social music discovery network message inbox.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

What is claimed is:

1. A social music network, comprising:
(a) a plurality of client agents, each client agent associated with a respective network member and configured to communicate and exchange data with a processing platform, wherein each client agent is further configured to provide one or more types of data regarding the respective network member's music library and playback data for the playback of media in the respective network member's music library, to the processing platform;

(b) a processing platform, wherein the processing platform includes a data storage element that includes member data regarding each respective member of the network, library data regarding each respective member's music library, and playback data of each respective member's music library; and (c) a processing module configured to:
   (1) access the library data and the playback data contained in the data storage element;
   (2) compare the library data and the playback data for two or more of the plurality of client agents; and
   (3) produce an output based on the comparison, wherein the output represents a music discovery tool to assist a member of the network to discover music of interest to that member.

2. The social music network of claim 1, wherein the library data further comprises data regarding the music library contents.

3. The social music network of claim 2, wherein the library data and playback data further comprises at least one of the following:
   an identifier of a music artist contained in the music library;
   an identifier of a song contained in the music library;
   a date at which a song or music artist was added to the library;
   a playcount for a song or music artist contained in the music library;
   a play date or time for a song or music artist contained in the library; and
   information regarding music currently being played by a media player associated with the network member.

4. The social music network of claim 1, wherein the output comprises a calculated similarity measure between a first music artist and a second music artist.

5. The social music network of claim 1, wherein the processing module is configured to produce and display the output as a calculated similarity measure between a first network member or first group of network members and a second network member or second group of network members.

6. The social music network of claim 5, wherein the calculated similarity measure is based on playcount and artist data.

7. The social music network of claim 1, wherein the output is a display of a relationship between a music library of a first network member or the music libraries of a first group of network members and a music library of a second network member or the music libraries of a second group of network members.

8. The social music network of claim 7, wherein the relationship between the music library of a first network member or the music libraries of a first group of network members and the music library of a second network member or the music libraries of a second group of network members is an indication of a difference between the music libraries.

9. The social music network of claim 7, wherein the processing module is further configured to filter the output to remove music content already in the music library of the first network member or the music libraries of the first group of network members or to remove music content already in the music library of the second network member or the music libraries of the second group of network members.

10. The social music network of claim 1, wherein the processing module is further configured to filter the output based on a similarity measure.

11. The social music network of claim 1, wherein the processing module is further configured to filter the output based on playcount data.

12. The social music network of claim 1, wherein the music discovery tool is a recommendation.

13. The social music network of claim 1, wherein the client agent is configured to generate a user interface to display the music discovery tool.

14. The social music network of claim 13, wherein the music discovery tool is an indication of the relative compatibility between the music interest of a first network member or first group of network members and the music interest of a second network member or second group of network members.

15. The social music network of claim 13, wherein the music discovery tool is an indication of music contained in the music library of a first network member or the music libraries of a first group of network members that is not contained in the music library of a second network member or is not contained in the music libraries of a second group of network members.

16. The social music network of claim 13, wherein the music discovery tool is an indication of music that is popular with a first network member or first group of network members that is not contained in the music library of a second network member or second group of network members.

17. The social music network of claim 13, wherein the music discovery tool is an indication of a song or artist that is common to the music libraries of a first network member or first group of network members and to a second network member or second group of network members.

18. The social music network of claim 13, wherein the music discovery tool is an indication of music that is similar to music contained in the music library of a first network member or group of network members but is not contained in the music library of the first network member or group of network members.

19. The social music network of claim 13, wherein the music discovery tool is an indication of a network member who is the first, newest, or biggest fan of a specific music artist.

20. The social music network of claim 12, further comprising a plurality of music recommendation inboxes, each associated with a respective network member, the inboxes configured to receive the recommendation.

21. The social music network of claim 1, wherein at least two of the plurality of client agents are configured to communicate with each other.

22. A social music network server, comprising:
   (a) a communications interface configured to receive data from a plurality of social music clients, wherein each social music client is associated with a respective network member and configured to provide one or more types of data regarding the respective network member's music library and playback data of media in the respective network member's music library, to the server;
   (b) a data storage element, wherein the data storage element includes member data regarding each respective member of the network, library data regarding each respective network member's music library, and playback data of each respective member's music library; and (c) a processing module configured to:
- (1) access the library data and the playback data contained in the data storage element;
- (2) compare the library data and the playback data for two or more of the plurality of client agents; and
- (3) produce an output based on the comparison, wherein the output represents a music discovery tool to assist a member of the network to discover music of interest to that member.

23. The social music network server of claim 22, wherein the library data and playback data further comprises data regarding the music library contents.

24. The social music network server of claim 23, wherein the library data and playback data further comprises at least one of the following:
- an identifier of a music artist contained in the music library;
- an identifier of a song contained in the music library;
- a date at which a song or music artist was added to the library;
- a playcount for a song or music artist contained in the music library;
- a play date or time for a song or music artist contained in the library; and
- information regarding music currently being played by a media player associated with a network member.

25. The social music network server of claim 22, wherein the output comprises a calculated similarity measure between a first music artist and a second music artist.

26. The social music network server of claim 22, wherein the processing module is configured to produce and display a calculated similarity measure between a first network member or first group of network members and a second network member or second group of network members.

27. The social music network server of claim 26, wherein the calculated similarity measure is based on playcount and artist data.

28. The social music network server of claim 22, wherein the output comprises a display of a relationship between a music library of a first network member or the music libraries of a first group of network members and a music library of a second network member or the music libraries of a second group of network members.

29. The social music network server of claim 28, wherein the relationship between the music library of a first network member or the music libraries of a first group of network members and the music library of a second network member or the music libraries of a second group of network members is an indication of a difference between the music libraries.

30. The social music network server of claim 28, wherein the processing module is further configured to filter the output to remove music content already in the music library of the first network member or the music libraries of the first group of network members or to remove music content already in the music library of the second network member or the music libraries of the second group of network members.

31. The social music network server of claim 22, wherein the processing module is further configured to filter the output based on a similarity measure.

32. The social music network server of claim 22, wherein the processing module is further configured to filter the output based on playcount data.

33. The social music network server of claim 22, wherein the music discovery tool is an indication of the relative compatibility between the music interest of a first network member or first group of network members and the music interest of a second network member or second group of network members.

34. The social music network server of claim 22, wherein the music discovery tool is an indication of music contained in the music library of a first network member or the music libraries of a first group of network members that is not contained in the music library of a second network member or is not contained in the music libraries of a second group of network members.

35. The social music network server of claim 22, wherein the music discovery tool is an indication of music that is popular with a first network member or first group of network members that is not contained in the music library of a second network member or second group of network members.

36. The social music network server of claim 22, wherein the music discovery tool is an indication of a song or artist that is common to the music libraries of a first network member or first group of network members and to a second network member or second group of network members.

37. The social music network server of claim 22, wherein the music discovery tool is an indication of music that is similar to music contained in the music library of a first network member or group of network members but is not contained in the music library of the first network member or group of network members.

38. The social music network server of claim 22, wherein the music discovery tool is an indication of a network member who is the first, newest, or biggest fan of a specific music artist.

* * * * *